United States Patent Office 3,129,055
Patented Apr. 14, 1964

3,129,055
MANUFACTURE OF SINTERED URANIUM
DIOXIDE
Alain Bel, Fontenay-aux-Roses, Roger Delmas, Wissous, and Bernard François, La Garenne-Colombes, France, assignors to Commissariat à l'Energie Atomique, Paris, France
No Drawing. Filed Mar. 31, 1960, Ser. No. 18,814
Claims priority, application France Apr. 28, 1959
9 Claims. (Cl. 23—14.5)

The problem of sintering uranium oxide to a density sufficient for its use in a pile has given rise to very considerable study.

Since the American and Canadian irradiation experiments, it is recognized that the liberation, from the crystalline network of the oxide, of fission product gases under the influence of neutrons occurs according to a simple diffusion law. It can be taken that the fraction of the fission gas liberated is strictly connected to the value of the porosity and it has been found in fact that the apparent density of the sintered product very considerably influences this phenomenon of the evolution of the gases formed during irradiation.

A density of the order of 95% of the theoretical density, namely a density of the order of 10.4 to 10.5, is considered to be satisfactory.

The production of such uranium oxide sinters is effected in various ways according to the starting material the mode of preparation of the uranium dioxide as a powder and the conditions of sintering.

The usual starting material chosen is either uranium peroxide or an ammonium uranate. Calcination after reduction of these materials leads to a pulverulent uranium dioxide, the specific surface of which is of the order of 1 to 3 m.$^2$/g. and has an approximate composition from $UO_{2.03}$ to $UO_{2.10}$.

In order to obtain sinters starting from this uranium dioxide powder, operation takes place either in a reducing atmosphere, dry hydrogen or dry cracked ammonia, at temperatures of the order of 1600° to 1750° C. or in a neutral atmosphere, for example argon, at temperatures of the order of 1200° to 1400° C. or in a wet hydrogen atmosphere or in water vapour at temperatures of the order of 1400° to 1500° C. In the first case, a high density sinter is obtained, but the temperatures required are very high, so that technologically they do not allow economic production on an industrial scale. In the two latter cases, the composition of the sintered oxide obtained is not stoichiometric and this particularity is not favourable to its incorporation in a pile. It is therefore necessary to submit the product, after its sintering to a treatment at high temperature in hydrogen in order to cause complete reduction.

Experiments utilizing uranium peroxide as the initial material have shown that the sintering temperature can be considerably reduced by employing as the starting material uranium dioxide powders having a high specific surface, at least 8 to 10 m.$^2$/g., but it is not known how to obtain economically and also in a reproducible manner such a material on an industrial scale.

The present invention has the object of providing a process for the preparation of sintered uranium dioxide of high density and stoichiometric composition starting from ammonium uranate, which process obviates these disadvantages.

This process is essentially characterized in that ammonium uranate is subjected to calcination at a temperature of the order of 350° to 450° C. for a time of the order of 5 to 20 hours, then to reduction in a dry cracked ammonia atmosphere in two temperature stages, the first at a temperature of the order of 350° to 450° C. and the second at a temperature of the order of 600° to 700° C., and then to reoxidation in the cold in an oxygen-containing nitrogen current, then, after incorporation of a moulding additive, to a first compression in vacuo followed by crushing and screening, then to a second compression serving to shape it and effected under a pressure of the order of 2.5 to 5 t./cm.$^2$ and, finally, after removal of the moulding additive, in vacuo and at a temperature limited upwardly to between 600° and 700° C. to sintering in a dry cracked ammonia atmosphere for five hours at a temperature of the order of 1250° to 1400° C.

The choice of the starting material is very important in order to obtain a uranium oxide powder having a high specific surface. In fact, it is known that the evolution of the chemical composition and the structure of the precipitates of uranium peroxide or ammonium uranate, during their calcination in air, causes an inherent variation of the specific surfaces. However, these variations of the specific surfaces as a function of time, at constant temperature, show a considerable difference in behaviour between uranium peroxide and ammonium uranate; although the specific surface changes considerably at each temperature in the case of the peroxide, it remains approximately constant over a large range of temperatures and duration in the case of ammonium uranate.

These results can be interpreted by the difference in structure between the trioxides obtained by starting from each of these two compounds.

Calcination of the peroxide produces an amorphous $UO_3$ which progressively changes to a crystalline phase with diminution of the specific surface.

On the contrary, the trioxide produced by ammonium uranate has the crystalline structure of a hydrated oxide of the formula $UO_3 \cdot nH_2O$ of a texture apparently much less dependent upon the conditions of calcination.

Other economic factors intervene in the calcination, namely temperature and time. At the same temperature, for example 400° C., 20 hours of calcination are necessary with uranium peroxide to obtain a powder having a specific surface of 17 m.$^2$/g. On the other hand, at the same temperature 400° C., five hours of calcination are amply sufficient to exceed 17 m.$^2$/g. with ammonium uranate. Also, if 10 hours is fixed as the time of calcination, it is necessary to heat uranium peroxide to 450° C. in order to obtain a powder having a specific surface which attains 17 m.$^2$/g., although with ammonium uranate it is sufficient to heat to 350° C.

The calcination of ammonium uranate thus permits the ready production of uranium trioxide with a specific surface higher than 15 m.$^2$/g., at a temperature of the order of 350° to 450° C. This specific surface can be considered as the criterion of suitability for sintering at relatively low temperature, this behaviour giving a considerable reliability for industrial production of powders of constant characteristics.

The reduction of the trioxide powder, obtained by calcination, should be effected without reducing its specific surface. For this purpose, operation is carried out, on the one hand, in an atmosphere of dry cracked ammonia and, on the other hand, in two temperature stages. The first stage at a temperature of the order of 350° to 450° C. has the object of obtaining a substantially complete reduction of $UO_3$ to $UO_2$ without diminution of the specific surface. Since at this stage of the reduction, this specific surface is definitely fixed, the reduction is completed by raising the temperature up to a second stage. It has been found that the temperature of the second stage is very important. In order to be able subsequently to effect sintering of the powder at a temperature between 1250° and 1400° C., the temperature of the second stage should be lower than 1000° C.; the sintering temperature will be the lower as the temperature of the second stage is also lower; however, this should be sufficient for the reduction to be complete, which leads to the adoption of an optimum temperature for the second stage; this is of the order of 600° to 700° C.

Subsequently, complete cooling of the powder obtained is then effected in a hydrogen atmosphere. The pulverulent dioxide obtained is pyrophoric. To avoid its combustion in air, it is re-oxidised in a controlled manner in a current of nitrogen containing 2% of oxygen. The thus-treated dioxide can be handled in air without risk of massive re-oxidation. At equilibrium, the chemical composition attained by the dioxide, during this controlled re-oxidation, is connected with the specific surface. Thus a uranium dioxide, the specific surface of which is about 15 m.²/g., modifies toward a mean composition corresponding to the formula $UO_{2.25}$.

A moulding additive is then added to the uranium dioxide powder, which is, for example, a mixture of camphor and stearic acid which is incorporated in the powder in the form of a solution in a volatile solvent; the volatile solvent can be alcohol, ether or carbon tetrachloride for example. The weight percentages of camphor and stearic acid with respect to the uranium dioxide can advantageously vary, respectively, between 2.5 and 3.5% and between 0.2 and 1%. As soon as the incorporation is terminated, the volatile solvent is eliminated by evaporation.

The apparent density of the mixture so obtained is of the order of 1. If shaping is effected by direct compression, this value leads to a ratio of the volume of the mixture to the volume of the compressed product which is equal to about 5, under a pressure of 5 t./cm.², which will necessitate highly elevated heights of the compressed matrix. On the other hand, with these low apparent densities, the differences in the charge density which appear will give rise to volumetric doses which are too imprecise for an industrial manufacture of constant quality; also, with these low apparent densities, the mixture will not closely follow the form of the mould, in direct compression, which gives the mouldings a shape which is not strictly uniform; it is thus necessary to proceed with a preliminary compression followed by grinding of the compressed product attained. Operation is thus effected in 2 stages; a first compression produces a compressed product which is then crushed and screened and a second compression of the granulate thus obtained produces the final form.

The first compression is effected in vacuo, which allows material to be de-aerated, in a compacting press. The compressed products obtained are then ground and screened. A granulate is thus obtained of which the apparent density is of the order of 2.5 and of which the very ready flow permits exact volumetric measurement in the shaping mould. This moulding is effected in an automatic hydraulic press under a pressure of the order of 2.5 to 5 t./cm.², for a time of the order of 5 seconds. The parts compressed under a pressure of 5 t./cm.² have an apparent density of at least 5.5.

Before effecting sintering, the moulding additive is eliminated in vacuo, at a temperature of the order of 180° C. and for two hours.

The sintering operation is carried out in a dry cracked ammonia atmosphere. The maximum temperature of this stage, maintained for 5 hours, is of the order of 1250° to 1400° C. Sintered masses are thus obtained, the apparent density of which is of the order of 10.40 to 10.70 and the thus-sintered uranium dioxide has a stoichiometric composition.

There will be described below, by way of example, a process for the manufacture of sintered uranium dioxide of high density and stoichiometric composition starting from ammonium uranate in accordance with the present invention.

The reaction conditions which are described with respect to this example should be considered to comprise part of the invention, it being understood that all equivalent arrangements could be used without exceeding its scope.

In this example, ammonium uranate is calcined for five hours at 400° C., then reduced in an atmosphere of dry cracked ammonia in two temperature stages, the first at 400° C. and the second at 650° C.; the uranium dioxide powder thus obtained is re-oxidised in the cold in a nitrogen current containing 2% of oxygen in order to change its composition from $UO_{2.00}$ to $UO_{2.23}$; its specific surface is thus about 17 m.²/g.; a mixture of 3% by weight of camphor and 0.75% by weight of stearic acid in solution in carbon tetrachloride is then incorporated into it. Densification is effected by a first compression in vacuo in a compacting press, followed by crushing and classification between 25-mesh and 120-mesh (ASTM) screens and then by moulding in a vertical hydraulic automatic press under a pressure of 4 t./cm.₂. The cylinders obtained have a diameter of 9.9 mm., a height of 12 mm. and an apparent density of 5.5. Elimination of the moulding additive is effected by heating at 180° C. in vacuo and for two hours. The operation of sintering is carried out in an atmosphere of dry cracked ammonia. The thermal cycle is as follows: (1) rate of increase of temperature: 75° C./hour, (2) five hour stage at 1350° C., (3) rate of reduction of temperature: 100° C./hour. Cylinders of sintered uranium oxide are thus obtained of stoichiometric composition having a diameter of 7.9 mm., a height of 9.5 mm. and an apparent density of 10.63.

We claim:
1. A process for the manufacture of high density uranium dioxide of stoichiometric composition consisting essentially of the steps of preparing a uranium trioxide, reduction of the uranium trioxide in two stages of temperature, the first stage at temperatures on the order of 350 to 450° C. and the second stage at temperatures on the order of 600 to 700° C., reoxidation of the reduced trioxide in the cold in a current of nitrogen containing oxygen, incorporation of a moulding additive therein, then compressing the resulting mixture under vacuum, crushing and then screening the compressed product, compressing the crushed and screened product for moulding under pressures on the order of 2.5 to 5 t./cm.², then eliminating the moulding additive under vacuum at a temperature limited upwardly from 600 to 700° C. and then sintering for approximately five hours at a temperature on the order of 1250 to 1400° C., the uranium trioxide being obtained by calcination of ammonium uranate at a temperature between 350 and 450° C. for from 5 to 20 hours and the two stage reduction step and the sintering step taking place in an atmosphere of dry cracked ammonia.

2. A process according to claim 1, in which the moulding additive is a mixture of camphor and stearic acid incorporated in the uranium dioxide powder in the form of a solution in a volatile solvent, the weight percentages of these materials with respect to the uranium dioxide varying for the camphor between 2.5 and 3.5% and for the stearic acid between 0.2 and 1%, the moulding additive, after compression, being eliminated in vacuo at a temperature of the order of 180° C.

3. A process according to claim 1, in which calcination of the ammonium uranate is effected between 390° and 410° C. for a duration of the order of five hours.

4. A process according to claim 1, in which the temperature of the first stage of reduction of the uranium trioxide is between 390° and 410° C.

5. A process according to claim 1, in which the temperature of the second stage of reduction of the uranium trioxide is between 640° and 660° C.

6. A process according to claim 1, in which the screening of the granulate of uranium dioxide comprises a classification between 25-mesh and 120-mesh (ASTM) screens.

7. A process according to claim 1, in which moulding of the uranium dioxide granulate is effected in a vertical hydraulic automatic press under a pressure between 3.8 and 4.2 t./cm.$^2$.

8. A process according to claim 1, in which the thermal cycle of sintering is as follows: rate of increase of temperature: 70° to 80° C./hour, stage of the order of 5 hours at a temperature between 1340° and 1360° C., rate of reduction of temperature: 95° to 105° C./hour.

9. A process according to claim 1, in which the incorporation of the moulding additive is effected by a solution in carbon tetrachloride of a mixture of camphor and stearic acid, the weight percentages of which with respect to the uranium dioxide are between 2.9 and 3.1% for camphor and between 0.65 and 0.75% for stearic acid.

References Cited in the file of this patent
UNITED STATES PATENTS
2,807,519    Polissar _____ Sept. 24, 1957

OTHER REFERENCES

Wirths et al.: "2nd U.N. Conference on Peaceful Uses of Atomic Energy," vol. 4, pp. 19–21 (September 1–13, 1958).

Hausner et al.: "Nucleonics," July 1957, pp. 94–103.

Harrington et al.: "Chem. Eng'n'g Progress," vol. 54, No. 3, pp. 65–70, March 1958.

Chalder et al.: "Second U.N. Conf. on Peaceful Uses of Atomic Energy," vol. 6, pp. 590–604, September 1–13, 1958.

Terraza et al.: "Second U.N. Conf. on Peaceful Uses of Atomic Energy," vol. 6, pp. 620–623, September 1–13, 1958.

Bel et al.: "Second U.N. Conf. on Peaceful Uses of Atomic Energy," vol. 6, pp. 612–619, September 1–13, 1958.

TID–7546, Book 2, pp. 384–400, 403, 414–422, 434–439, 443, 447, March 1958.